Nov. 10, 1925.
W. F. MAYER
1,561,179
PARALLEL CRANK PUMP OR MOTOR
Filed Nov. 12, 1919
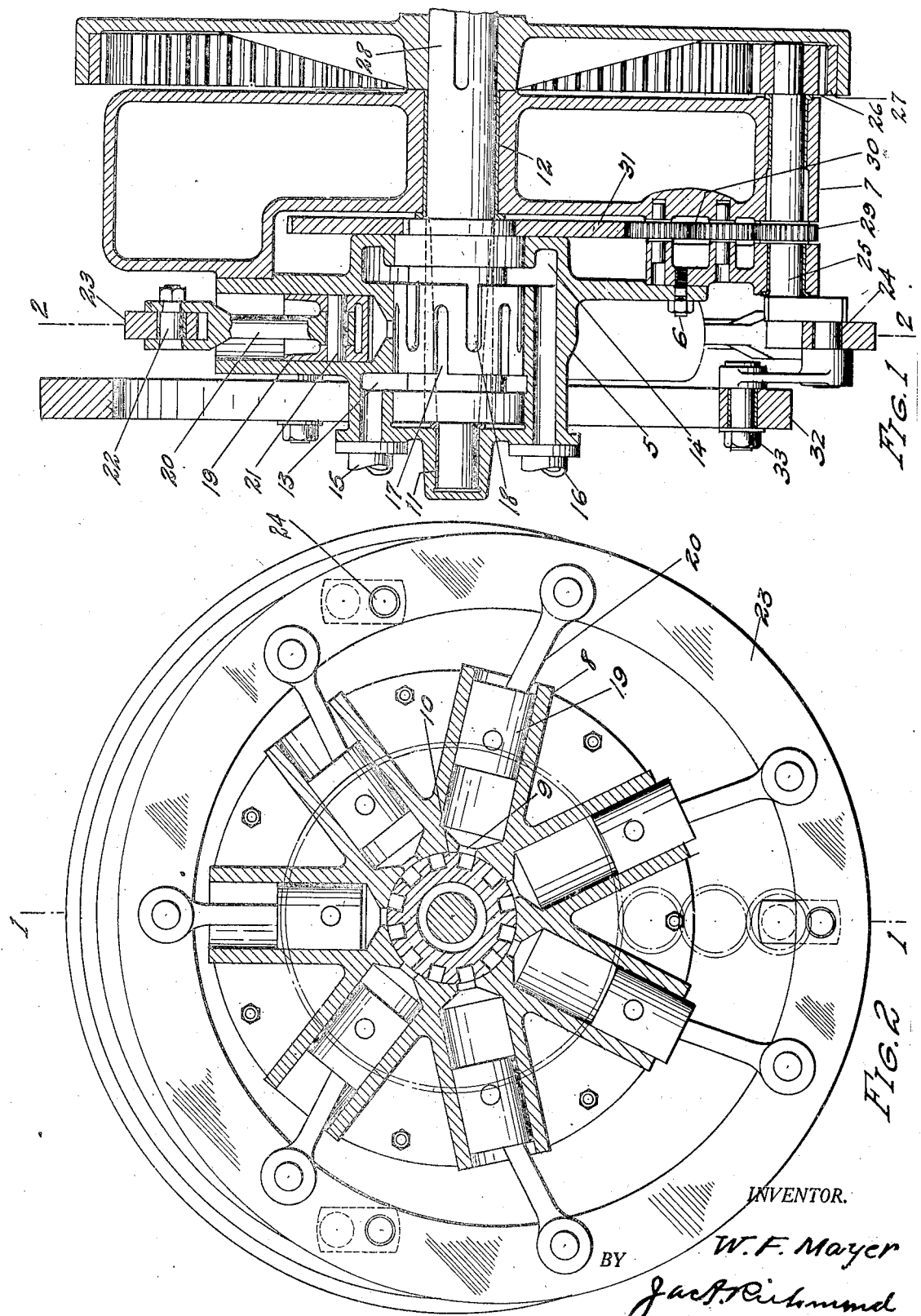
INVENTOR.
W. F. Mayer
BY
Jack F. Richmond
ATTORNEY.

Patented Nov. 10, 1925.

1,561,179

UNITED STATES PATENT OFFICE.

WALDEMAR F. MAYER, OF PHILADELPHIA, PENNSYLVANIA, ASSIGNOR TO TAYLOR-WHARTON IRON AND STEEL COMPANY, OF HIGH BRIDGE, NEW JERSEY, A CORPORATION OF NEW JERSEY.

PARALLEL-CRANK PUMP OR MOTOR.

Application filed November 12, 1919. Serial No. 337,423.

*To all whom it may concern:*

Be it known that I, WALDEMAR F. MAYER, a citizen of Switzerland, residing at Philadelphia, in the county of Philadelphia and State of Pennsylvania, have invented certain new and useful Improvements in Parallel-Crank Pumps or Motors, of which the following is a specification.

This invention relates to a power pump or motor, wherein, through the use of a parallel crank motion, a comparatively larger capacity is had.

In the ordinary reciprocating piston type of motor, the pressure of the piston taken up by the wrist pin and crank pin, is limited by the bearing capacity of such pins, and due to the larger relative motion of the crank pin in the connecting rod head, the specific bearing pressure must be kept lower than in the wrist pin end of the connecting rod. If, however, the parallel crank design of the present invention is introduced, both ends of the connecting rod have equal relative motion, and the piston pressure may be practically doubled without risk of abrasion of the bearing surfaces.

The invention also contemplates the use of a slow speed balanced valve, as distinguished from the usual unbalanced rotary valve, in order to avoid the comparatively large starting resistance of the latter.

The invention further provides multiple driving pinions of constant and equally-balanced torque, and the engagement of these pinions with the main driving gear in equal spaced relation, to thereby obtain a pure driving torque on such gear.

In the drawings:—

Fig. 1 is a sectional view of the improved motor.

Fig. 2 is a section of the same on line 2—2 of Fig. 1.

The invention is here shown as a hydraulic motor, comprising a motor casing 5, secured by bolts 6 to a fixed crank casing 7. The motor casing comprises a series of cylinders 8, preferably in one plane and radially arranged. The inner ends of the respective cylinders communicate with the central bore of the casing through ports 9.

A rotary valve 10 is mounted in the bore of the motor casing, being guided in bearings 11 and 12, and the motor casing bore is enlarged at the respective ends to form annular channels 13 and 14 respectively. Each channel has a pipe connection, as 15 and 16, for the introduction and escape of the motive fluid. The valve 10 is circumferentally enlarged between the channels 13 and 14, and is formed in the surface of the enlargement with opposed channels 17 and 18, extending longitudinally of the valve. The channels 17 and 18 alternate, and all similar channels, as 17, communicate with one annular channel, as 13, while the remaining channels 18 communicate with the remaining annular channel 14. These valve channels 17 and 18 are successively presented to the ports 9 of the cylinders in the rotation of the valve, as will be evident.

The pistons 19 of the respective cylinders 8, have their connecting rods 20, connected at one end to the piston by wrist pins 21, and the opposite ends to a pin 22, mounted in a ring 23. Thus both ends of the connecting rods have equal relative motion. Crank pins 24, are mounted in the ring 23, and are given the necessary motion by the movement of the ring.

The cranks on crank pins 24 may have shafts 25, for driving purposes, and such shafts are here shown as provided at their outer ends with pinions 26, engaging an internal gear drive member 27, which is keyed to a driven shaft 28, mounted in bearings 11 and 12 in the fixed casing 7.

The rotary valve is to be driven at a speed reduction governed by the number of cylinders, that is at a ratio equal to the number of cylinders less one. This in the instance illustrated would be a ratio of one to six. The valve channels must number double the speed ratio of the valve, that is, in the instance shown, there should be twelve such channels.

The motive fluid entering the cylinders 8, forces the respective pistons outwardly, and through the connecting rods 20, wrist pins 21 and ring pins 22, moves the ring 23, and thereby operates the cranks 24. The shafts 25 or more particularly one of them is utilized to drive the valve 10 at proper speed, through a proper-sized gear 29, secured on such shaft, in mesh, through appropriate idlers 30, with a proper-sized gear 31 secured on the valve end. The reduction drive of the valve is secured through the relative sizes of the gears 29 and 31.

The parallel crank motion described insures equal relative motion of both ends of the connecting rods, hence the piston pressure can be largely increased over the usual type of reciprocating-piston motors; the rotary valve is balanced to thereby avoid the starting resistance of the ordinary unbalanced rotary valve; and the torque of the driving pinions 26 is equal and constant, and as such pinions are equally spaced relative to the gear 27, a pure driving torque is obtained on the latter.

In the event the driven shaft is horizontal, and a perfect weight balance is required, it is desirable to add a balancing means for the ring 23 and its connected parts. Such means is here shown as a balance ring 32 of proper weight, supported on crank pins 33, forming part of or keyed to pins 24, and arranged exactly in opposition to the operating cranks on such pins.

Having thus described the invention, what is claimed as new, is:—

A multiple cylinder motor having a plurality of radially arranged cylinders, a ring about all of said cylinders and having direct and equidistant connection with the pistons of the respective cylinders, a plurality of equally spaced cranks operated by said ring, a power gear, and equally spaced driving pinions operated by said cranks and engaging said power gear and a balance ring carried by the first mentioned ring and movable in opposition thereto.

In testimony whereof I affix my signature.

WALDEMAR F. MAYER.